(12) United States Patent
Sager et al.

(10) Patent No.: US 8,722,160 B2
(45) Date of Patent: May 13, 2014

(54) INORGANIC/ORGANIC HYBRID NANOLAMINATE BARRIER FILM

(75) Inventors: Brian M. Sager, Palo Alto, CA (US); Martin R. Roscheisen, San Francisco, CA (US)

(73) Assignee: aeris CAPITAL Sustainable IP Ltd., Grand Cayman (KY)

( * ) Notice: Subject to any disclaimer, the term of this patent is extended or adjusted under 35 U.S.C. 154(b) by 353 days.

(21) Appl. No.: 10/698,988

(22) Filed: Oct. 31, 2003

(65) Prior Publication Data
US 2005/0095422 A1  May 5, 2005

(51) Int. Cl.
*B32B 1/02* (2006.01)
*B32B 23/00* (2006.01)

(52) U.S. Cl.
USPC ........ 428/34.1; 428/34.2; 428/35.7; 428/35.9; 428/36.9

(58) Field of Classification Search
USPC ......... 428/34.1, 35.7, 35.9, 35.8, 36.9, 36.91, 428/34.2
See application file for complete search history.

(56) References Cited

U.S. PATENT DOCUMENTS

| | | | | |
|---|---|---|---|---|
| 4,869,755 A | * | 9/1989 | Huschka et al. | 136/259 |
| 5,372,888 A | * | 12/1994 | Ogawa et al. | 428/422 |
| 5,554,670 A | * | 9/1996 | Giannelis et al. | 523/209 |
| 5,731,060 A | | 3/1998 | Hirukawa et al. | |
| 6,057,035 A | * | 5/2000 | Singh et al. | 428/403 |
| 6,133,522 A | * | 10/2000 | Kataoka et al. | 136/259 |
| 6,146,225 A | | 11/2000 | Sheats et al. | 445/24 |
| 6,264,741 B1 | * | 7/2001 | Brinker et al. | 117/11 |
| 6,413,645 B1 | | 7/2002 | Graff et al. | 428/446 |
| 6,472,467 B1 | * | 10/2002 | Chiao | 524/755 |
| 6,573,652 B1 | | 6/2003 | Graff et al. | 313/512 |
| 6,623,861 B2 | | 9/2003 | Martin et al. | 428/412 |
| 6,727,513 B2 | * | 4/2004 | Ishida et al. | 257/12 |
| 6,818,163 B1 | * | 11/2004 | Fibiger et al. | 264/51 |
| 6,866,901 B2 | * | 3/2005 | Burrows et al. | 428/1.5 |

FOREIGN PATENT DOCUMENTS

EP  1225188  * 7/2002

OTHER PUBLICATIONS

Sugiyama et al., "Gas Permeation Through the Pinholes of Plastic Film Laminated with Aluminum Foil", *Vuoto*, vol. XVIII, No. 1-2,—51-54, Gennaio-Guigno 1999.
K.K.S. Lau, et al., "Hot-wire Chemical Vapor Deposition (HWCVD) of Fluorocarbon and Organosilicon Thin Films", *Thin Solid Films*, vol. 395, pp. 288-291, Elsevier Science, 2001.
Akira Nakajima et al., "Transparent Superhydrophobic Thin Films with Self-Cleaning Properties", Langmuir 2000, No. 16, pp. 7044-7047, American Chemical Society, Published on Web Jul. 25, 2000.
P.E. Burrows, et al.,, "Gas Permeation and Lifetime Tests on Polymer-Based Barrier Coatings", SPIE Annual Meeting Invited Paper, Aug. 30, 2000.
Dennis Hausmann et al., "Rapid Vapor Deposition of Highly Conformal Silica Nanolaminates", *Science*, vol. 298, pp. 402-406, Oct. 11, 2002.

(Continued)

*Primary Examiner* — Marc Patterson
(74) *Attorney, Agent, or Firm* — Joshua D. Isenberg; JDI Patent

(57) ABSTRACT

An inorganic/organic hybrid nanolaminate barrier film has a plurality of layers of an inorganic material that alternate with a plurality of layers of an organic material. Such a barrier film can be fabricated using nanocomposite self-assembly techniques based on sol-gel chemistry.

23 Claims, 1 Drawing Sheet

(56) References Cited

OTHER PUBLICATIONS

Alan Sellinger et al., "Continuous Self-Assembly of Organic-Inorganic Nanocomposite Coatings that Mimic Nacre", *Nature*, vol. 394, pp. 256-260, Macmillan Publishers Ltd, Jul. 16, 1998.

Barthelat et al., "Tensile Testing of Abalone Nacre Miniature Specimens Using Microscopy and Speckle Correlation", p. 2, col. 4, paragraph 2.

Menig et al., Quasi-static and Dynamic Mechanical Response of *Haliotis rufescens* (Abalone Shells), Acta Mater. 48 (2000), p. 2383-2398.

Sheldal Product offering (found at www.sheldahl.com/Product/bulletins/ProductOfferings.ppt) Jan. 2003.

Maibaum et al., "Micelle Formation and the Hydrophobic Effect", J. Phys. Chem. B 2004, 108, 6778-6781.

Japanese Patent Office : Office Action for JP2006538120 mailed Aug. 17, 2010.

"Fabrication and Properties of Nanolaminates".

Abstract of "*Microstructural evolution of $ZrO2_T HfO_2$ Nanolaminate Structures Grown by Atomic Layer Deposition*" by H. S. Kim, P. C. McIntyre, and K. C. Saraswat, from the Journal of Materials Research, vol. 19, No. 2, Feb. 2004, pp. 643-650.

\* cited by examiner

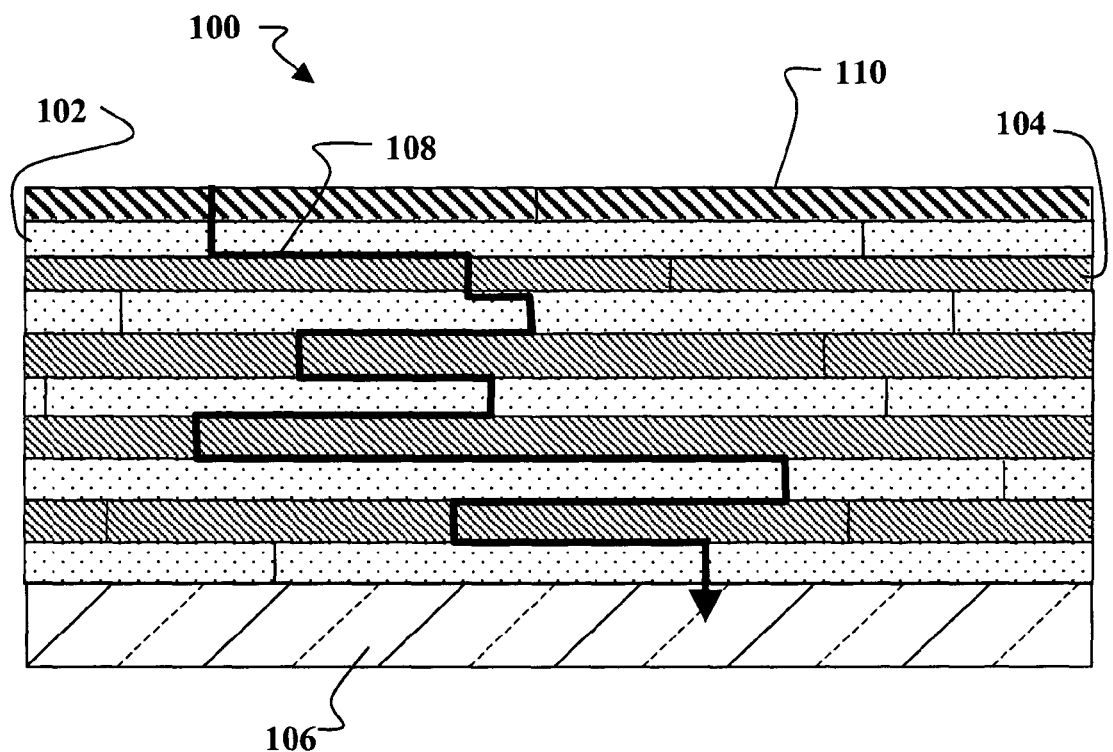

INORGANIC/ORGANIC HYBRID NANOLAMINATE BARRIER FILM

FIELD OF THE INVENTION

The present invention is directed to barrier films and more particularly to multilayer barrier coatings.

BACKGROUND OF THE INVENTION

Many products that are sensitive to their environment require a barrier that is highly impermeable to water, oxygen and other gases while remaining lightweight and durable. For example, optoelectronic devices require transparent barrier materials to extend their useful operating lives. Currently, glass is used as a transparent barrier material. Unfortunately, glass is often undesirable because it is either too fragile or too heavy or both. Plastics are more lightweight and less fragile materials. Unfortunately, commercially available plastics lack the desired level of environmental resistance for many optoelectronic applications.

For example, to build durable devices, the active elements of polymer-based LEDs may require incorporation of barrier layers with oxygen permeability levels as low as $10^{-5}$ cc/m$^2$/day and water vapor permeability levels as low as $10^{-6}$ g/m$^2$/day. A 7 mil thick coating of polyethylene teraphthalate (PET) has an oxygen transmission rate of 8.7 cc/m$^2$/day and a water vapor permeability of 10 g/m$^2$/day. State of the art plastics such as Alcar can protect components with oxygen and water vapor permeability levels of about 7 cc/m$^2$/day and 0.016 g/m$^2$/day respectively.

Single barrier coatings of thin films of inorganic materials such as Al, SiO$_2$ Al$_2$O$_3$ and Si$_3$N$_4$ can be vacuum deposited on polymer substrates to improve barrier impermeability. Such single layer coatings can reduce oxygen and water vapor permeability to levels of about $10^{-3}$ cc/m$^2$/day and $10^{-3}$ g/m$^2$/day respectively.

Multilayer barrier coatings have been developed using a "sandwich" strategy with an inorganic layer is situated between two polymer layers to further improve the aggregate barrier properties. Sheats and coworkers (U.S. Pat. No. 6,146, 225) used a 35 nm thick silicon nitride as an inorganic layer and a one micron thick layer of an acrylate as the polymer material to achieve a barrier with a water-vapor permeation rate of $1.8 \times 10^{-7}$ g/m$^2$/day, which is about 40 times better than the requirement for most optoelectronic devices. However, this material is not optically transparent, limiting its use to certain applications only.

More recently, Graff and colleagues (U.S. Pat. No. 6,413, 645; U.S. Pat. No. 6,573,652 and U.S. Pat. No. 6,623,861) have developed barrier materials using a multi-stack approach where each stack includes a sputter-deposited, 40 nm barrier layer of a metal oxide, metal nitride, or metal carbide, followed by a flash-evaporated, one micron layer of an acrylate polymer or multilayer thin films comprised of flash-evaporated plastic. While these multi-stack barrier films have useful environmental resistance relative to many previously developed materials, their vacuum-based mode of production is time-consuming and relatively expensive, especially for multiple-stack coatings. Further, the vacuum-based deposition methods limit both the area upon which a coating can be placed (the area must be smaller than the deposition chamber), which in turn limits their use for larger area devices. In addition, flash evaporation and sputter deposition do not tend to provide for uniform conformal coatings of large area surfaces, especially for non-planar substrates with inherent curvature (or even three-dimensional barrier-protection targets). It would be desirable to have a multi-layer, transparent, and durable film that provides for uniform, inexpensive and conformal coating of larger areas with effective environmental resistance in a range of environments.

Thus, there is a need in the art, for a barrier film that overcomes the above disadvantages and a corresponding method for making such a film.

BRIEF DESCRIPTION OF THE DRAWINGS

The teachings of the present invention can be readily understood by considering the following detailed description in conjunction with the accompanying drawings, in which:

FIG. 1 is a cross-sectional schematic diagram of an inorganic/organic hybrid nanolaminate barrier film according to an embodiment of the present invention.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Embodiments of the present invention are directed to an inorganic/organic hybrid barrier nanolaminate film and methods for making the film. The film 100, shown schematically in FIG. 1, generally includes multiple alternating layers of organic material 102 and inorganic material 104. The thickness of the inorganic layers 102 and organic layers 104 can be from about 0.1 nm to about 1 nm or from about 1 nm to about 10 nm or from about 1 nm to about 100 nm. The inorganic layers 102 can be silicates, although other inorganic materials can be formed from suitable alkoxides as described below. The barrier film 100 can be made substantially transparent by appropriate choice of the number, thickness, and composition of the inorganic layers 102 and organic layers 104. Although a relatively small number of layers is shown in FIG. 1 for the sake of clarity, a barrier film for a typical device can have many more layers, e.g., several thousand.

The organic layers 104 are polymers such as polyethylene naphthalate (PEN), polyether etherketone (PEEK), or polyether sulfone (PES). In addition, polymers created from styrene polymer precursors, methyl styrene polymer precursors, (meth)acrylate polymer precursors, both fluorinated and non-fluorinated forms of these precursors, and combinations of two or more of these precursors can be used as the organic layers 104. These organic materials are desirable because of their superior thermal properties and excellent gas barrier characteristics. Furthermore, one or more of the organic layers 104, e.g., an uppermost layer 110, may optionally be a superhydrophobic layer such as fluoroalkylsilane. Fluoroalkylsilane thin films are described, e.g., by Akira Nakajima et al., in "Transparent Superhydrophobic Thin Films with Self-Cleaning Properties", Langmuir 2000, 16, 7044-7047, which is incorporated herein by reference.

The layer structure of the barrier film 100 provides a long path for water or oxygen to penetrate the barrier film to an underlying substrate 106, e.g., via pinholes and/or gaps at interfaces between layers as indicated by the path 108. The permeability of the nanolaminate barrier film 100 to oxygen and water vapor can be adjusted by changing the number of layers. By using hundreds to thousands of interdigitated inorganic layers 102 and organic layers 104 within the barrier film 100, the large number of layers combined with randomly located pinholes within the nanolaminate results in tortuous paths for molecules such as water vapor and oxygen that might enter from the environment outside of the barrier film 100. The more layers, the more tortuous the path for permeating molecules. Thus, the more layers, the less permeable the barrier film 100 is to water vapor and oxygen. In embodiments of the present invention, there can be 100 or more, 1000 or more, 10,000 or more or 100,000 or more individual layers in the composite barrier film 100.

Furthermore, hydrophobic groups can be incorporated into or eliminated from the polymer precursors used to form the organic layers 104 to tune (increase and/or decrease) the hydrophobicity of the resulting organic layers 104 and, in turn, adjust the permeability of the barrier film 100. For example, non-polar hydrophobic groups, including but not limited to methyl groups and benzyl (aromatic) groups, can be attached to the polymer precursors. In general, increasing ionic strength increases hydrophobic interactions. For example, the anions and cations listed below are in a series from those that highly favor hydrophobic interactions to those that decrease hydrophobic interactions.

Anions: $PO_4^{3-}$, $SO_4^{2-}$, $CH_3COO^-$, $Cl^-$, $Br^-$, $NO^-$, $ClO_4^-$, $I^-$, $SC_n^-$.

Cations: $NH_4^+$, $Rb^+$, $K^+$, $Na^+$, $Cs^+$, $Li^+$, $Mg^{2+}$, $Ca^{2+}$, $Ba^{2+}$.

Any of these anions and/or cations and/or similar compounds can be incorporated into the polymer precursors, resulting in polymers with tuned hydrophobicity.

In addition, hydrophobic amino acids such as tryptophan, isoleucine, phenylalanine, tyrosine, leucine, valine, methionine, and alanine could be used as side chains for the polymer precursors.

Furthermore, Gemini surfactants (also called dimeric surfactants) are highly reactive and could be used as structure-directing agents. Gemini surfactants have two hydrophilic head groups and two hydrophobic groups in the molecule, in contrast to conventional surfactants that have only single hydrophilic and single hydrophobic groups.

By suitable choice of the number and composition of layers, the oxygen permeability of the barrier film 100 can be made less than about 1 cc/m²/day, 0.1 cc/m²/day, 0.01 cc/m²/day, $10^{-3}$ cc/m²/day, $10^{-4}$ cc/m²/day, $10^{-5}$ cc/m²/day, $10^{-6}$ cc/m²/day, or $10^{-7}$ cc/m²/day. Similarly, the water vapor permeability of the barrier film 100 can be made less than about 1 g/m²/day, 0.1 g/m²/day, 0.01 g/m²/day, $10^{-3}$ g/m²/day, $10^{-4}$ g/m²/day, $10^{-5}$ g/m²/day, $10^{-6}$ g/m²/day, or $10^{-7}$ g/m²/day.

The nanolaminate barrier film 100 can be made in a single-step (or few sequential step) process by self-assembly using sol-gel techniques. Self-assembly of nanocomposite materials using sol-gel techniques is described, e.g., in U.S. Pat. No. 6,264,741 to Brinker et al., the entire contents of which are incorporated by reference. Generally speaking, a sol can be prepared, e.g., by combining one or more alkoxides, an alcohol, water and dilute hydrochloric acid (HCl) and heating the resulting mixture. A coupling agent is then introduced to the mixture followed by a surfactant (or Gemini surfactant), in a quantity sufficient that the initial surfactant concentration is below the critical micelle concentration. Subsequently, one or more polymer precursors, e.g., monomers suitable for the formation of PEN, PEEK or PES are then added followed by a cross-linker agent and an initiator. Alternatively, the polymer precursors can include styrene polymer precursors, methyl styrene polymer precursors, (meth)acrylate polymer precursors, either fluorinated or non-fluorinated forms of these, precursors and combinations of two or more of these precursors. A substrate is coated with the sol and the alcohol is allowed to evaporate. The alcohol evaporation drives a self-assembly reaction that forms the multilayer barrier structure described with respect to FIG. 1.

Suitable alkoxides are structured around a central element X. Suitable central elements X include Al, B, Ba, Pb, Se, Si, and Sn. Other suitable central elements X include transition metals, e.g., Ag, Au, Cd, Co, Cr, Cu, Fe, Ir, Mn, Mo, Nb, Ni, Sr, Ta, Ti, V, W, Y, Zn, Zr, etc. For silicon (Si)-based inorganic layers 102 examples of suitable alkoxides include polysiloxanes such as tetraethylorthosilicate (TEOS). For titanium (Ti)-based inorganic layers 102 examples of suitable alkoxides include titanium ethoxide or titanium isopropoxide.

Sol Preparation and Tuning

By way of example, and without loss of generality, a sol can be prepared, e.g., by combining tetraethylorthosilicate (Si$(OCH_2CH_3)_4$, also known as TEOS), ethanol, water and dilute HCl (dilute so as to minimize the siloxane condensation rate) in molar ratios of $1:3.8:1:5\times10^{-5}$ respectively and heated at about 60° C. for about 90 minutes. The sol is then diluted with ethanol in a 1:2 ration after which water and dilute HCl are added. A coupling agent such as 7-octenlytrimethoxysilane (OTS), or methacryloxypropyl trimethoxysilane (MPS) is then introduced to the mixture followed by a surfactant such as cetyltrimethylammonium bromide (CTAB) so that the initial surfactant concentration is below the critical micelle concentration. After stirring for about one hour, a monomer (e.g., 2,6-Dimethylnaphthalene (DMN; to create polyethylene naphthalate (PEN)), or a set of monomers such as bisphenol A and di-para-fluorophenylsulfone (B/FS, to create polyether sulfone (PES)) is then added followed by a cross-linker agent (such as hexanedioldimethacrylate (HDM) and an initiator. For ultraviolet initiation benzoin dimethylether (BME), can be added. For thermal initiation, 1,1'-azobis(1-cyclohexane carbonitrile) (ACHN) can be used).

To tune the chemistry of the sol, the concentration of the surfactant, water, ethanol, TEOS, and organic monomers can be varied. Through variation of the nature of the surfactant and its concentration, various structures for the inorganic layers 102 and organic layers 104, such as lamellar layers, tubules, or nanostructures exhibiting 1- and 3-dimensional connectivity (e.g., hexagonal or cubic) of the constituent phases, respectively, can be produced and the characteristic dimension (d-spacing) of the composite architecture controlled. Through variation of the organic and inorganic precursors, a wide range of materials combinations can be prepared. Annealing the films at about 125° C.-150° C. or greater (and/or below the decomposition temperature of the organic materials) further densifies the siloxane material and improves impermeability.

Coating and Nanolaminate Self-Assembly

The substrate 106 can be coated with the sol mixture by any suitable technique, such as dip coating, spin coating, spray coating, web coating, or microgravure web coating. Suitable coating machines are commercially available, e.g., from Faustel, Inc., of Germantown, Wis. In particular, a Continuous Coater Type BA from Werner Mathis AG of Zurich, Switzerland may be used to coat the substrate with the sol mixture. It is desirable to coat the substrate with the sol in a wet layer approximately 1 microns to 10 microns to 100 microns thick. Thicker wet layers, e.g., about 100 microns to about 1 millimeter thick, can also be used. Since the barrier film 100 can be fabricated without the use of vacuum equipment, the processing is simple and comparatively low in cost.

By way of example, the substrate can be rapidly coated with the sol, e.g., by dip coating (e.g., about 25 cm/min dip and withdrawal rate; for large area substrates) or spin coating (e.g., about 1500 rpm for about 1 minute for small area substrates). After coating, the ethanol component of the sol begins to evaporate, and the increasing concentrations of water and surfactant cause the surfactant concentration to exceed the critical micelle concentration, resulting in both micelle formation and the incorporation of the alcohol-soluble organic monomers into the micellar interiors. This TEOS and CTAB-based sol gel chemistry provides for self-assembly of nanostructures whose chemical backbones condense into dense, stable materials.

Evaporation-induced partitioning provides a means to promote the co-dispersion of both organic and inorganic components throughout the nascent and emerging siloxane framework of the sol gel. As the ethanol continues to evaporate, the silica-surfactant-monomer micelles self-assemble into interfacially organized liquid crystal, lyotropic mesophases on a time scale of about 10 seconds. Polymerization of the organic material in the alternating interfacial layers can be induced by either ultraviolet light or heat, which also stabilizes the polymerizing inorganic siloxane framework. The resulting nanocomposite structure in the multi-layer film is stabilized by (a) organic polymerization, (b) inorganic polymerization, and (c) covalent bonding at the organic interfacial surfaces. A single coating step can produce films at least 1000 nm thick comprised of individual layers, each roughly 1 nm thick. By taking advantage of the self-assembling nature of the materials, each set of 1000 layers can be formed in only seconds. A greater number of layers in the resulting barrier film can be obtained by repeating the coating and evaporation sequence multiple times and/or by depositing thicker coatings.

Options and Alternative Embodiments

Conformal or non-conformal nanolaminate barrier coatings of the type described above can be applied to a variety of planar and non-planar surfaces, in two- and three-dimensions. More specifically, this nanolaminate approach could be used to encapsulate and or protect optoelectronic devices (e.g., LEDs, solar cells, FETs, lasers), pharmaceutical products (tablets in packages, etc), medical devices, food products (packaged foods, beverages, candies), display screens (touch panel displays, flat panel displays), and electroluminescent windows and other windows and transparent films and coatings, electronic components as well as the chassis for appliances used in rugged environments.

Furthermore, by incorporating dyes or pigments into the film, the nanolaminate could be colored to provide for use as an optical filter in a variety of optoelectronic devices.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. The appended claims are not to be interpreted as including means-plus-function limitations, unless such a limitation is explicitly recited in a given claim using the phrase "means for."

What is claimed is:

1. A device comprising:
    a solar cell encapsulated with a self-assembled barrier film structure thereon comprised of:
    a plurality of layers of an inorganic material; and
    a plurality of layers each consisting of an organic polymer wherein the layers of organic polymer alternate with the layers of inorganic material and wherein more than one of layers of the organic polymer contain a superhydrophobic material;
    wherein adjacent layers of the organic polymer and the inorganic material are covalently bonded layers characterized by direct organic polymer to inorganic material covalent bonds which form in the self-assembled barrier film structure even with superhydrophobic material in more than one of the layers of the organic polymer;
    wherein random location of pinholes in the layers of the inorganic material and the layers of the organic polymer requires a tortuous pathway marked by repeated turns or bends for any water to pass through the self-assembled barrier film structure, wherein the superhydrophobic material in more than one of the layers of the organic polymer provide surfaces that impede that movement of water between adjacent layers of the organic polymer and the inorganic material.

2. The device of claim 1 wherein the total number of layers of organic polymer and layers of inorganic material in the film is between about 100 and about 1000 layers, or between about 1000 and about 10,000 layers, or between about 10,000 layers and about 100,000 layers.

3. The device of claim 1 wherein each of the layers of inorganic material has a thickness of about 0.1 nm to about 1 nm; about 1 to about 10 nm; or about 1 nm to about 100 nm.

4. The device of claim 3 wherein the barrier film is substantially transparent.

5. The device of claim 1 wherein the barrier film has a permeability to oxygen less than about 1 $cc/m^2/day$, 0.1 $cc/m^2/day$, 0.01 $cc/m^2/day$, $10^{-3}$ $cc/m^2/day$, $10^{-4}$ $cc/m^2/day$, $10^{-5}$ $cc/m^2/day$, or $10^{-6}$ $cc/m^2/day$.

6. The device of claim 5 wherein the barrier film has a permeability to water vapor less than about 0.01 $g/m^2/day$, $10^{-3}$ $g/m^2/day$, $10^{-4}$ $g/m^2/day$, $10^{-5}$ $g/m^2/day$, or $10^{-6}$ $g/m^2/day$.

7. The device of claim 1 wherein the superhydrophobic material includes fluororalkylsilane.

8. The device of claim 1 wherein the layers of organic polymer are made from polymer precursors to which one or more one or more hydrophobic groups have been added.

9. The device of claim 8 wherein the one or more hydrophobic groups are selected from the group of non-polar hydrophobic groups, methyl groups, benzyl (aromatic) groups, $PO_4^{3-}$, $SO_4^{2-}$, $CH_3COO^-$, $Cl^-$, $Br^-$, $NO^-$, $ClO_4^-$, $I^-$, $SC_n^-$ anions, $NH_4^+$, $Rb^+$, $K^+$, $Na^+$, $Cs^+$, $Li^+$, $Mg^{2+}$, $Ca^{2+}$, $Ba^{2+}$ cations, tryptophan, isoleucine, phenylalanine, tyrosine, leucine, valine, methionine, and alanine.

10. The device of claim 1 wherein the barrier film is made from a sol including one or more Gemini surfactants.

11. The device of claim 1 wherein one or more of the layers of organic polymer and/or inorganic material are in the form of lamellae.

12. The device of claim 1 wherein one or more of the layers of organic polymer and/or inorganic material are in the form of tubules.

13. The device of claim 1 wherein adjacent layers of the organic polymer and inorganic material are covalently bonded to each other at an interface between organic and inorganic materials.

14. The device of claim 1 wherein the layers of the organic polymer are discrete layers of organic polymer and wherein the layers of inorganic material are discrete layers of inorganic material.

15. The device of claim 1 wherein alternating layers of organic polymer and inorganic material present a long and tortuous penetration path through the barrier film to an underlying substrate.

16. The device of claim 1 wherein layers of the inorganic material are self-assembled layers of inorganic material.

17. The device of claim 1 wherein layers of the organic polymer are self-assembled layers of organic polymer.

18. The device of claim 1 wherein at least one coating of material self-assembles into the alternating plurality of layers of inorganic material and plurality of layers of organic polymer.

19. The device of claim 1 wherein layers consisting of the organic polymer and layers of the inorganic material have different material compositions.

20. The device of claim 1 wherein the layers of inorganic material are layers consisting of the inorganic material.

21. An inorganic/organic nanolaminate barrier film, comprising:
   a self-assembled structure comprised of:
   a plurality of layers of an inorganic material; and
   a plurality of layers each consisting of an organic polymer wherein the layers of organic polymer alternate with the layers of inorganic material and wherein more than one of layers of the organic polymer contain a superhydrophobic material;
   wherein adjacent layers of the organic polymer and the inorganic material are covalently bonded layers characterized by direct organic polymer-inorganic material covalent bonds between adjacent layers which form in the self-assembled structure even with the superhydrophobic material in the one or more layers of the organic polymer;
   wherein the layers of the organic polymer contain superhydrophobic material.

22. A device comprising:
   a photovoltaic device with an inorganic/organic nanolaminate barrier film formed thereon, wherein the self-assembled barrier film comprises:
   a plurality of layers of an inorganic material; and
   a plurality of layers each consisting of an organic polymer wherein the layers of organic polymer alternate with the layers of inorganic material and wherein more than one of the layers of the organic polymer contain a superhydrophobic material;
   wherein adjacent layers of the organic polymer and the inorganic material are covalently bonded layers characterized by direct organic polymer-inorganic material covalent bonds between adjacent layers which form in the self-assembled barrier film even with the superhydrophobic material in the one or more layers of the organic polymer;
   wherein the layers of the organic polymer contain superhydrophobic material; wherein a bottom layer of the barrier film in contact with the photovoltaic device is an inorganic layer;
   wherein random location of pinholes in the layers of the inorganic material and the layers of the organic polymer requires a tortuous pathway marked by repeated turns or bends for any water to pass through the self-assembled barrier film structure, wherein the superhydrophobic material in more than one of the layers of the organic polymer provide surfaces that impede that movement of water between adjacent layers of the organic polymer and the inorganic material.

23. The barrier film of claim 1 wherein superhydrophobic decreases the permeability of the barrier film while still providing for self-assembly of nanostructures by way of micelle formation and incorporation of polymer precursors into the micellar interiors and the barrier film is at least 1000 nm thick comprised of individual layers, each about 1 nm thick.

* * * * *